(No Model.)
T. A. EDISON.
ELECTRICAL TRANSMISSION OF POWER.
No. 370,131. Patented Sept. 20, 1887.
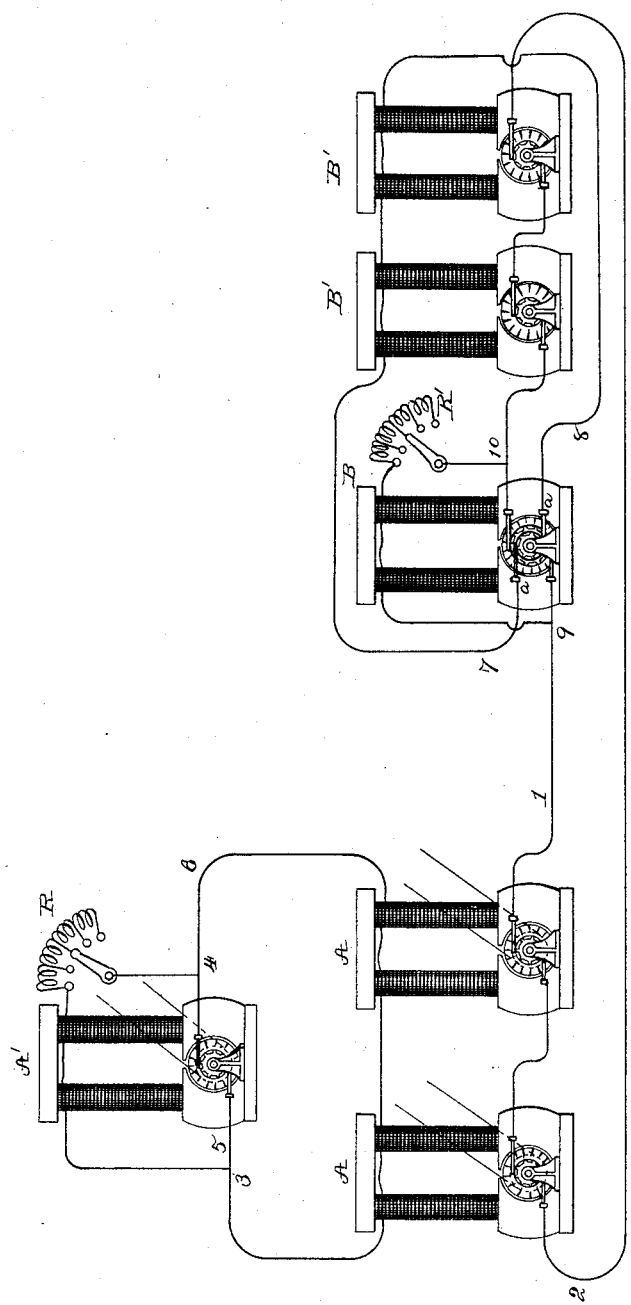
ATTEST:
E. C. Rowland
H. W. Seely
INVENTOR:
Thomas A. Edison
By Rich'd N. Dyer
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,131, dated September 30, 1887.

Application filed June 7, 1883. Serial No. 97,331. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 573,) of which the following is a specification.

The object of my invention is to effectively operate a number of independent electro-dynamic motors from dynamo or magneto electric machines placed at a distant source of power and to regulate all said motors simultaneously from a common point. By "independent" motors I mean mechanically separate from each other and not placed on the same driving-shaft, as is the case with those described in my Patent No. 248,435. In my application No. 97,330 is shown for this purpose a local electrically-operated source of electricity for energizing the fields of the motors, consisting of a generator run by a belt from one of the motors, whose circuit includes the fields of the motors, and the current generated by which is regulated to regulate the motors. By my present invention I do away with this separate generator; and to energize the fields of the motors I provide one or more combined motors and generators, each consisting of a field-magnet and a double-wound armature core. One set of coils on said core is connected in the circuit of the generators and acts as a motor to revolve the other set of coils between the poles of the field-magnet, so that the latter set generate current, being connected with a circuit including the field-coils of the series of independent electro-dynamic motors. As a source of supply for the motors, I prefer to employ a series of dynamo-electric generators, and I prefer to energize their fields by a single separate exciter, which is the best arrangement with generators in series. It is evident, however, that any other arrangement of generators may be employed in connection with the independent motors having the combined generator and motor for energizing their fields.

My invention is illustrated diagrammatically in the accompanying drawing.

A A represent any desired number of magneto-electric machines connected in series, from which main conductors 1 2 extend.

A' is a dynamo-electric machine, having its field-coils in a shunt-circuit, 3 4, from the circuit 5 6, which includes the field-coils of the magneto-electric machines A A. An adjustable resistance, R, is placed in the shunt-circuit 3 4 for regulating the generation of current by the generator A', and consequently that by the series of generators A A. The circuit 1 2 includes the motor-coils of a combined generator and motor, B, and the armatures of the electro-dynamic motors B' B'.

The commutator of the combined generator and motor B, on which the brushes *a a* bear, is connected with its generator-coils, and from these brushes a circuit, 7 8, extends, which includes the field-coils of the motors B' B'.

The field-magnet of the combined generator and motor B is energized by a shunt, 9 10, from the main circuit 1 2, and this shunt contains an adjustable resistance, R', by varying which the production of current is regulated and the speed of the motors B' B' is controlled.

The resistance R is adjusted to regulate the supply of current by the generators A A in accordance with the requirements of the series of motors.

I do not claim herein the series of generators with an exciter for all their fields, since this will form the subject of another application.

What I claim is—

1. The combination, with one or more dynamo or magneto electric machines, of two or more independent electro-dynamic motors connected therewith and a combined generator and motor having its motor-coils in the circuit of said generators and its generator-coils connected with the fields of said motors, substantially as set forth.

2. The combination of one or more magneto-electric machines, an exciting-machine for its or their field-magnets, two or more independent electro-dynamic motors connected with said magneto machines, and a combined generator and motor having its motor-coils in the circuit of said magneto-electric machines, and its generator-coils connected with the field-magnet coils of said electro-dynamic motors, substantially as set forth.

This specification signed and witnessed this 1st day of June, 1883.

THOS. A. EDISON.

Witnesses:
H. W. SEELY,
EDWARD H. PYATT.